Aug. 25, 1931.  B. F. SCHMIDT  1,820,501
TWIN-CABLE GEAR SHIFTING MECHANISM
Filed Aug. 3, 1928  2 Sheets-Sheet 1

INVENTOR
B. F. Schmidt
BY
ATTORNEY

Aug. 25, 1931.  B. F. SCHMIDT  1,820,501
TWIN-CABLE GEAR SHIFTING MECHANISM
Filed Aug. 3, 1928   2 Sheets-Sheet 2
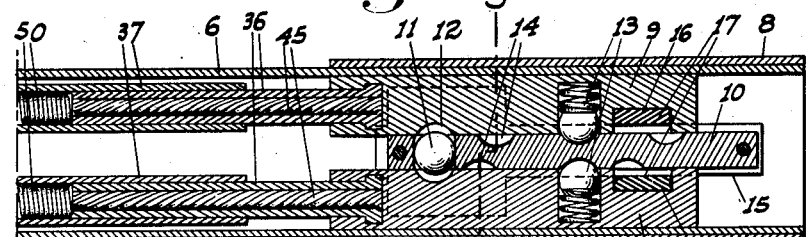
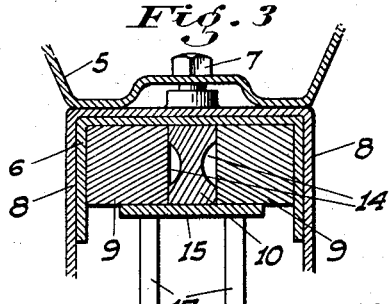
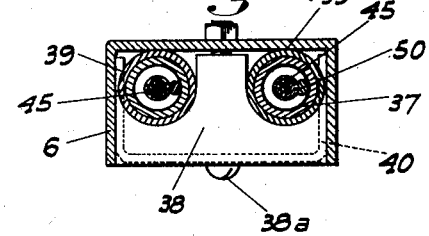
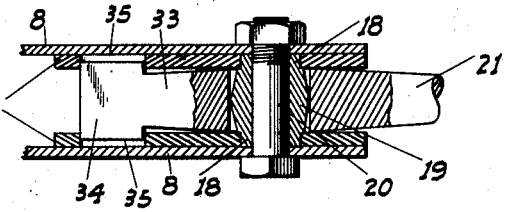
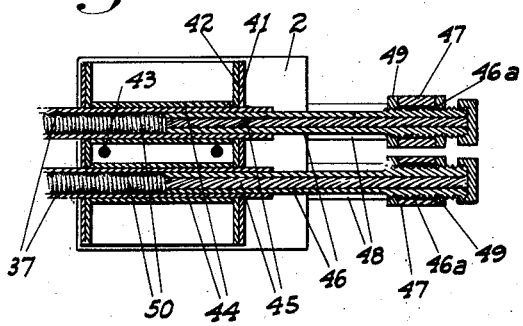
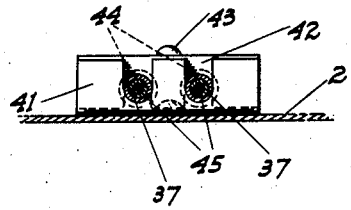
INVENTOR
B. F. Schmidt
BY
ATTORNEY Patented Aug. 25, 1931

1,820,501

UNITED STATES PATENT OFFICE

BENJAMIN F. SCHMIDT, OF LOS ANGELES, CALIFORNIA

TWIN-CABLE GEAR SHIFTING MECHANISM

Application filed August 3, 1928. Serial No. 297,310.

This invention relates to gear shifting mechanism for motor vehicles of the type shown in my Patent No. 1,630,076, dated May 24, 1927; and particularly represents improvements and refinements over the structure of said patent and also over that of my Patent No. 1,736,630, dated Nov. 19, 1929. The principal object of the present invention is to simplify and improve the connecting structure between the shifting lever and the cable members over what is shown in said patent and co-pending application; to provide an improved securing and clamping means for the cable housings, and to provide an improved form of cable which will take the necessary pushing strains without tending to buckle and without having to set the cables so close in their housings as to set up a binding action which makes for hard shifting.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Fig. 2 is an enlarged sectional plane taken on the line 2—2 of Fig. 1.

Fig. 3 is a fragmentary cross section taken on the line 3—3 of Fig. 2.

Fig. 4 is a cross section taken on the line 4—4 of Fig. 1.

Fig. 5 is a sectional plan taken on the line 5—5 of Fig. 1.

Fig. 6 is a sectional plan taken on the line 6—6 of Fig. 1.

Fig. 7 is a cross section taken on the line 7—7 of Fig. 1.

Figure 1:
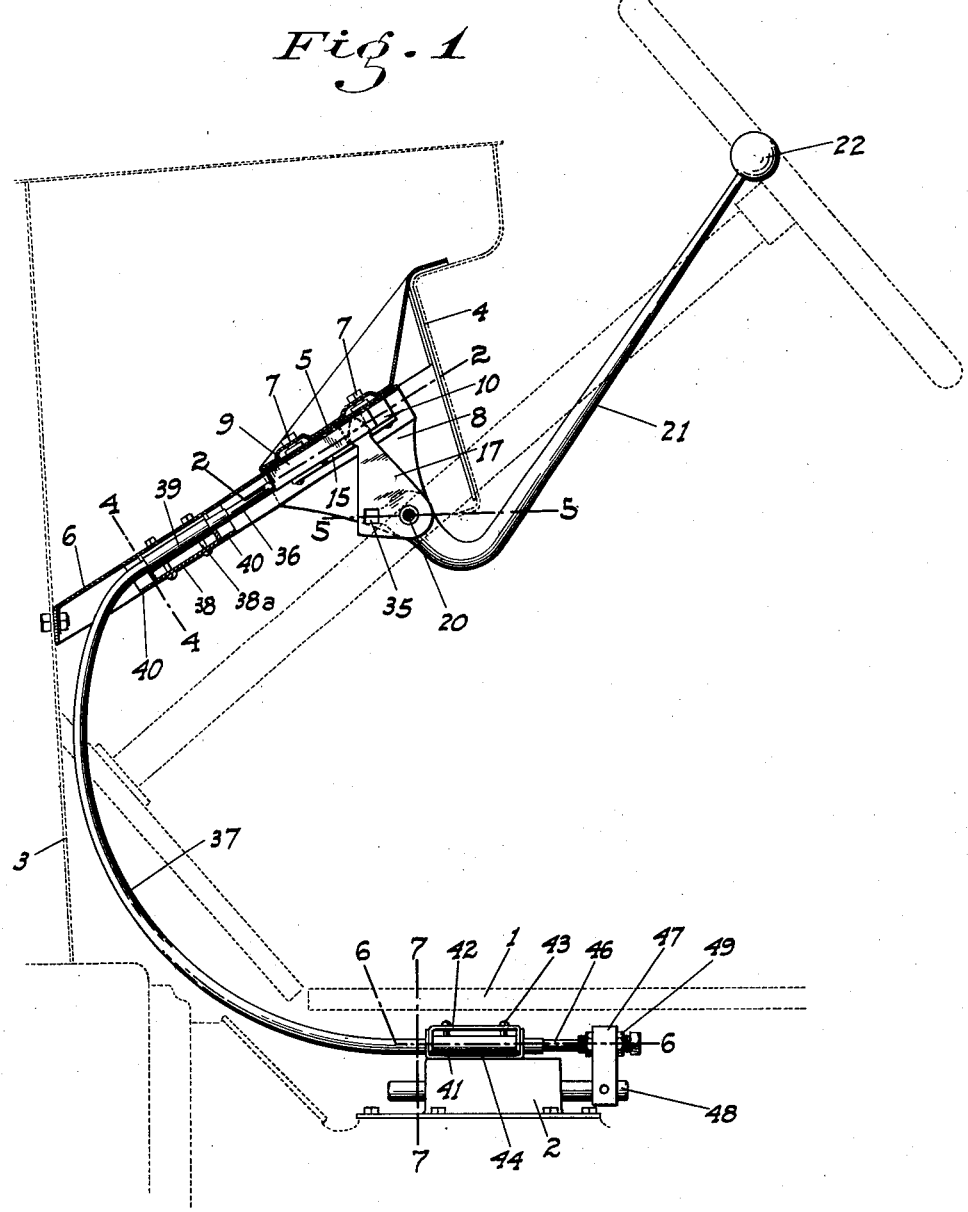
Fig. 1 is a side elevation of my improved gear shifting mechanism as applied to a motor vehicle, certain parts being in section.

Referring now more particularly to the characters of reference on the drawings, the numeral 1 denotes the floor of the driver's compartment of a motor vehicle under which the usual transmission or gear box 2 is disposed. 3 indicates the customary bulk head projecting upwardly from the floor at the rear of the engine and 4 is the dash board positioned a certain distance rearwardly of said bulk head.

Permanently mounted on the front face of the dash board by welding or the like is a downwardly and forwardly extending bracket 5 to which is secured a similarly sloping inverted channel member 6. This member is bolted at its forward end to the bulk head and is secured to the bracket by bolts 7 or the like. Mounted in fixed connection with the channel and bracket under the latter is another bracket straddling the channel and including transversely spaced ears 8 depending below said channel. A pair of independent rectangular bars 9 are disposed between the sides of the channel adjacent the ears 8, said bars being held in proper spaced relation by a fixed block 10 therebetween and being slidable lengthwise relative to said block and channel. A neutral interlocking ball 11 is mounted in the block for alternate engagement with recesses 12 in the adjacent faces of the bars; while the latter have spring pressed balls 13 projecting from their adjacent faces to engage longitudinally spaced recesses 14 in the sides of the block. By this means only one bar can move at a time and the bar moved is yieldably held from further movement in one direction or the other after it has been shifted a certain predetermined distance. Mounted on and under the block 10 is a plate 15 somewhat wider than said block so as to project under the bars and form a support therefore to prevent the same from dropping out of place.

The bars have rectangular recesses 16 in their adjacent faces which are transversely alined, when the ball recesses 12 are similarly alined. Permanently engaging the recesses 16 are the upper ends of short arms 17. These arms at their lower ends are independently turnable on the reduced end portions 18 of a bushing 19 which fits snugly between the ears 8 and is secured by a bolt 20 passed through the bushing and ears. The outer surface of the central portion of the bushing slopes outwardly both ways toward the center, and forms the pivot for the shifting lever 21. This lever has a straight bored hole engaging the bushing, and the sides of the lever slope away from the hole as shown in Fig. 5, so as to permit the necessary universal rocking movement of the lever while enabling the same to fit snugly between the arms 17. The lever bends down from its pivoted end to avoid the dash board as shown in Fig. 1 and then extends upwardly and rearwardly the desired distance to a termination in an operating knob 22. At its pivoted end the lever has a short and forwardly projecting extension 33 having a cross head 34 on its outer end projecting simultaneously but not deeply into transversely alined openings 35 in the arms 17 ahead of the bushing. The width of the head is such that when the lever is swung to one side or the other said head is disengaged from the opening of the opposite arm and vice versa. When the lever is in a neutral position neither arm can be moved even though the head then engages both arms, since the latter are permanently connected to the bars 9 which cannot move together owing to the interlocking features 11—12. When the lever is shifted to one side or the other, however, and is then rotated on its pivotal bushing the corresponding bar will be shifted in a straight longitudinal direction without any of the arcuate movement of the lever and arm being imparted thereto.

Rigidly secured to the bars are rigid tubular members 36 which project forwardly to and are slidable in the adjacent ends of cylindrical housings 37. These housings are bent to extend forwardly to adjacent the bulk head 3, then downwardly through the floor and then rearwardly under the floor to the top of the transmission box 2. At their upper ends the housings project into the channel 6 and are clamped therein by slotted cradles 38 engaging said housings and projecting between the sides of the channel and being secured thereto by bolts 38a. Sleeves 39 are mounted on the housings between the ends of the saddle, which is prevented from longitudinal displacement in the channel by additional short channel members 40 welded in the channel 6 in inverted relation thereto and disposed at the ends of said clamping saddle. At their lower ends the housings 37 seat in a cradle member 41 secured on the box 2, and an inverted slotted saddle 42 fitting between the cradle and engaging the housings clamp the same to the cradles, said saddle being secured to the cradle by screws 43. Spacer sleeves 44 are also disposed about the housings 37 between the ends of the saddle.

The tubular members 36 surround and are rigidly secured to the adjacent ends of cables 45. These cables extend through the housings 37 and also through and are rigidly secured to other rigid tubular members 46 slidable in the lower ends of said housings. The outer ends of the members 46 are threaded as shown at 46a to engage depending blocks 47 which are connected to the shifting rods 48 of the transmission. Lock nuts 49 on the threaded portions 46a hold the members 46 against possible rotation in the blocks. This arrangement enables the relative positions of the shifting rods and members 46 to be accurately adjusted so as to insure the correct neutral position of the rods relative to the upper shifting mechanism when assembling the structure.

Extending about the cables from end to end in close relation therewith and abutting against the inner ends of the members 36 and 46 are closely wound spiral shields or sleeves 50 which of course have inherent flexibility sufficient to enable them to follow the bends of the housings 37. By means of this arrangement a push on the upper members 36 is taken by the spiral shields instead of by the cables, while a pull is taken by the cables with no tendency to expand the shields. In other words, the construction is such that the compressive and tensional strains are imparted to the elements having the best inherent strength for the purpose so that it is not necessary for the flexible unit thus formed to have a very close fit in its housing, nor yet it is necessary to make said unit of very large diameter in order for it to have the necessary strength for its purpose.

At the same time, the pushing load may also be considered as being taken by the cables, which are amply strong enough for the purpose, and are capable of so doing owing to the outer close fitting shields or sleeves, which positively hold the strands of the cables in place, and prevent the cables from buckling under a push.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a gear shift mechanism for motor vehicles, a supporting structure, means for securing said structure onto the dashboard of a vehicle transversely spaced bars slidably mounted on said structure, transversely spaced arms depending from the bars and slidably engaged at one end therewith, pivot means for the lower end of the arms mounted on the structure, and a shift lever for selective engagement with the arms pivoted on the supporting structure and projecting first downwardly from said pivot connection and then upwardly at a rearward angle.

2. In a gear shift mechanism for motor vehicles, a supporting structure, transversely spaced bars slidably mounted on said structure, transversely spaced arms depending from the bars and slidably engaged at one end therewith; the supporting structure including ears depending alongside the arms outwardly thereof, a bushing secured between the ears and having reduced end portions on which the arms are pivoted, a shift lever pivoted on the bushing between the arms and a member on the lever for selective engagement with openings in the arms.

3. A structure as in claim 2, in which the central portion of the bushing, on which the lever is turnable, slopes outwardly both ways toward the center, and the sides of the lever slope inwardly away from the bushing engaging bore thereof to permit universal rocking movement of the lever.

4. A gear shift mechanism for motor vehicles including a rigid inverted channel member to extend between the dashboard and engine bulkhead of the vehicle, transversely spaced tubular housings extending from the channel to the transmission housing of the vehicle and terminating at their upper ends in a rearwardly facing direction and parallel to the channel between the sides thereof, a saddle engaging said upper ends of the housing fitting in and secured to the channel to clamp the housings against the channel, transversely spaced bars in the channel rearwardly of the housing and bearing against the top and sides thereof, a plate under the bars secured to the channel and on which said bars slidably rest, a partition between the bars, means for sliding the bars selectively, and flexible members mounted in the housings and connected at one end to said bars and at the other end to the gear shift rods of the transmission mechanism of the vehicle.

5. In a gear shift mechanism for a motor vehicle having an instrument board, a supporting bracket mounted on the forward side of said board, a shift lever pivoted on said bracket extending to a point below the bottom level of the board and then upwardly and rearwardly to adjacent the steering wheel of the vehicle, and operative connections between the bracket end of the lever and the transmission mechanism of the vehicle.

6. In combination with the casing of a motor-vehicle transmission and horizontal shifter rods projecting from one end thereof, a pair of tubes having horizontal portions disposed above the casing paralled to the rods, a cradle fixed on the casing in which said tubes seat, a clamping saddle to cooperate with said tubes and projecting therefrom, flexible elements slidably mounted in the tubes, rigid connections between the outer ends of said elements and the corresponding ends of the shifter rods, and means operable from the instrument board of the vehicle for selectively moving said elements longitudinally.

In testimony whereof I affix my signature.
BENJAMIN F. SCHMIDT.